United States Patent Office 3,503,996
Patented Mar. 31, 1970

3,503,996
7-HYDROXYCOUMARIN PREPARATION
Hans Dressler, Monroeville, and Kenneth G. Reabe, Delmont, Pa., assignors to Koppers Company, Inc., a corporation of Delaware
No Drawing. Filed July 17, 1967, Ser. No. 653,649
Int. Cl. C07d 7/28
U.S. Cl. 260—343.2      5 Claims

ABSTRACT OF THE DISCLOSURE

Consistent improvement in the preparation of 7-hydroxycoumarin by the condensation of resorcinol and malic acid is achieved by a process wherein nitrobenzene or nitrotoluene is added to the condensation mixture. The presence of the nitro-aromatic hydrocarbon during the condensation reaction results in improved and reproducible yields and removes the need for adherence to stringent process conditions throughout the reaction. The 7-hydroxycoumarin is useful in preparing optical bleaches and as an intermediate in chemical processes.

BACKGROUND OF THE INVENTION

The preparation of 7-hydroxycoumarin is generally carried out using the Pechmann reaction for the condensation of resorcinol and malic acid as described in Organic Reactions, volume 7, page 20 (1953). The process, while suitable for laboratory purposes, is not feasible in commercial applications because of the varying yields obtained with slight modifications in reaction conditions. During the condensation, the reaction mass tends to solidify, making stirring impossible, and severe foaming occurs. These conditions cause variations in the results and the product is often obtained in poorly filterable form or as a tar. Even with changes in temperature, reaction ratios and concentrations, these problems persist.

It has been found that the problems of solidification and foaming can be overcome, and that consistently good yields of 7-hydroxycoumarin can be obtained by following the procedure of the present invention.

SUMMARY OF THE INVENTION

Reproducible, good yields of 7-hydroxycoumarin are obtained and the problems of solidification and foaming substantially decreased if resorcinol and malic acid are condensed in the presence of 0.2–3.0 moles, per mole of resorcinol, of a nitro-aromatic hydrocarbon. Resorcinol and malic acid are contacted with sulfuric acid, in the presence of nitrobenzene or nitrotoluene at an elevated temperature, for a time sufficient to produce 7-hydroxycoumarin. For the purpose of simplicity, nitrobenzene will be used as the preferred nitro-aromatic hydrocarbon in the following description.

DETAILED DESCRIPTION

The reaction of resorcinol and malic acid according to the present invention is illustrated by the following equation:

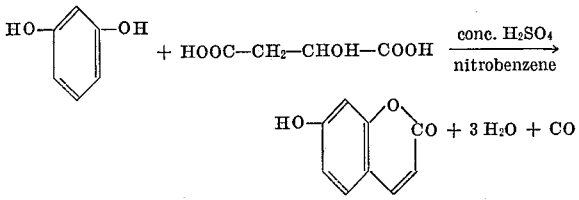

The effect of the nitrobenzene in the reaction mixture is not fully understood, but consistently good yields of 7-hydroxycoumarin are produced without the usual problems of solidification and foaming when using the process of the present invention. The effect does not appear to be a solvent effect or the result of dilution because other solvents have been used and no benefits found by their use. For example, solvents such as water, ortho-dichlorobenzene, diethyl ether, and ethyl acetate gave no improvement when substituted for nitrobenzene in the present process.

The amount of nitrobenzene to be added to the resorcinol-malic acid reaction mixture can be as low as 0.2 mole of nitrobenzene per mole of resorcinol in the mixture, or as much as 3 moles per mole of resorcinol. Although nitrobenzene in amounts larger than about 3 moles per mole of resorcinol may be used, there is no advantage to be gained by such use and the added cost is a disadvantage. At least about 0.2 mole per mole of resorcinol is needed to provide the beneficial results described herein. Generally, 0.5 mole of nitrobenzene per mole of resorcinol is preferred.

The reaction of resorcinol and malic acid theoretically proceeds using stoichiometric amounts. The prior art has suggested using an excess of resorcinol in the condensation reaction, see Organic Reactions, volume 7, page 20 (1953). Although such amounts give good results, it has been found that as much as a 20% excess of malic acid over a stoichiometric amount is desirable in carrying out the process of the present invention.

The temperature at which the condensation reaction is carried out is in the order of 100 to 150° C. Preferably, a temperature of between 100–130° C. is used. Lower temperatures do not give sufficient yields and solids precipitate from the reaction mass, while higher temperatures tend to lead to the formation of tars. The temperature should, of course, be kept below the boiling point of nitrobenzene or loss of this additive will result, giving no process benefits. The process is advantageously carried out at atmospheric pressure.

The reaction time necessary for the condensation reaction will vary according to the temperature. It has been found that reaction times in the order of 0.25 to 0.5 hour at temperatures of about 125–130° C. are sufficient to produce good yields of 7-hydroxycoumarin.

The process of the present invention has provided a commercially feasible method for the production of the valuable compound, 7-hydroxycoumarin. The process, contrary to prior art processes, does not result in solidification of the reaction mass and decreases substantially foaming which normally occurs during such condensations. The product, 7-hydroxycoumarin, is formed in a physical state which is readily filtered and separated from the reaction mass. These advantages permit the production of 7-hydroxycoumarin in good yields, such yields being reproducible, which have lower production costs and can be used for commercial purposes.

Our process is further illustrated by the following examples.

Example I

To a 200-gallon reactor, there was fed 635 lbs. (6.3 mols) of 98% sulfuric acid to an agitated heel of 170 lbs. (1.55 mols) of resorcinol, 230 lbs. (1.72 mols) malic acid and 86 lbs. (0.70 mol) nitrobenzene at about 100° C. The acid was added during 5 minutes, the temperature rising to 106° C. After 12 minutes from the start of acid addition, the temperature peaked at 118° C. and steam was applied to the reactor jacket to hold the temperature at 115–118° C. After 40 minutes, from the start of acid addition, the reaction mixture was cooled to 30° C. The homogeneous reaction mixture (80 gal.) was poured into 200 gallons of ice water at a rate to keep the drowned liquor below 30° C. The 7-hydroxycoumarin crystals settled and the spent acid was decanted. Fresh water (160 gal.) was added to the settled crystals and decantation repeated. The 7-hydroxycoumarin crystals were heated to 100° C. in the presence of water to remove nitrobenzene by steam distillation, filtered and vacuum dried at 80° C. and 120 torrs to give 112 lbs. of 7-hydroxycoumarin (45% yield based on resorcinol).

Example II

To a 500-milliliter flask, equipped with stirrer, thermometer, and reflux condenser, there was charged 120 milliliters of 97% sulfuric acid. A mixture of resorcinol, 60 grams (0.56 mole) and malic acid, 49.2 grams (0.366 mol) was added to the stired sulfuric acid in 10 minutes. The exotherm raised the temperature from 25° to 44° C. with no apparent gas evolution. On continued stirring of the turbid, light-yellow slurry, gas evolution became apparent at 60° C. and the light yellow foamy mass became unstirrable. After 30 minutes reaction, the exotherm had reached a maximum of 80° C. A small sample of the reaction mass was removed at this point and found to be completely soluble in cold water. The reaction mass was heated and finally some stirring was possible at 110° C. A sample was removed and found to contain a small amount of water-insoluble solids. Heating was continued for 30 minutes at 110–120° C. with some foaming evident in the reddish-orange slurry. The reaction mass was then added to 1,000 mls. of crushed ice and water and slightly tacky, reddish-orange solids precipitated. After filtering, the filtrate cake was washed with 500 mls. of water. The resulting product, crude 7-hydroxycoumarin, 20.6 grams corresponded to a 34% conversion.

Example III

Example II was repeated, except that the addition of a small amount, 17 milliliters, of water was made initially to the 120 milliliters of sulfuric acid. The resorcinol-malic acid mixture was added in small increments during 1.5 hours at 40–85° C. to give a yellow slurry. On continued stirring, the mass thickened considerably and an additional 20 milliliters of water was added to maintain some fluid consistency. The reaction mass was maintained at 90–120° C. for 2 hours and the resulting dark-red solution poured into ice and water and treated as in Example I. No product crystallized from the dark reddish brown solution on cooling and the mixture was discarded.

Example IV

The process of Example I was repeated using the addition of various solvents (in place of nitrobenzene) to the reaction mass. The use of ortho-dichorobenzene diethyl ether, or ethyl acetate, only gave red oils or resinous materials after the usual workup.

Example V

A series of experiments were carried out generally according to Example I using 30 grams (0.273 mole) of resorcinol, 25 grams (0.187 mole) of malic acid, 75 milliliters of concentrated sulfuric acid and varying amounts of nitrobenzene, as shown in Table I. In each of the experiments, the brown slurry was stirred and heated to 105° C. during 18 minutes, and at 105–121° C. during 0.5 hour. At the end of this period, a dark-brown solution resulted which was cooled to about 25° C. and stirred into 500 milliliters of ice water. The slurry was filtered, the cake washed with water and benzene, then dried to give the resultant weights of red solids described below. The results of these experiments are listed in Table I.

TABLE I

| Example | Nitrobenzene (moles) | Reaction Temp., °C. | Time, Hours | Product Yield, percent |
|---|---|---|---|---|
| A | 0.49 | 100–120 | 0.75 | 40 |
| B | 0.24 | 100–120 | 0.5 | 40 |
| C | 0.12 | 105–121 | 0.5 | 45 |
| D | 0.065 | 113–120 | 0.5 | 44 |

Example VI

The procedure of Example I was repeated using nitrotoluene in place of nitrobenzene. The results were comparable to those of Example I with reduced foaming and formation of 7-hydroxycoumarin in good yield and easily filterable form.

What is claimed is:

1. Process for the preparation of 7-hydroxycoumarin comprising contacting resorcinol and about a stoichiometric quantity of malic acid with sulfuric acid in the presence of 0.2–3.0 moles, per mole of resorcinol, of a nitro-aromatic hydrocarbon selected from nitrobenzene and nitrotoluene, at a temperature of 100–150° C.

2. The process of claim 1 wherein said elevated temperature is between 100–130° C.

3. The process of claim 1 wherein said malic acid is present in an amount of up to 20% excess of a stoichiometric quantity based on said resorcinol.

4. In the process for preparing 7-hydroxycoumarin by the condensation of resorcinol and about a stoichiometric amount of malic acid in the presence of sulfuric acid and at a temperature of 100–150° C., the improvement comprising carrying out said condensation in the presence of a nitro-aromatic hydrocarbon selected from the group consisting of nitrobenzene and nitrotoluene.

5. The process of claim 4 wherein said nitroaromatic is present in an amount of 0.2–3.0 moles per mole of resorcinol.

References Cited

Bridge et al.: J. Chem. Soc. (1937), p. 1533.

JAMES A. PATTEN, Primary Examiner